Patented July 18, 1939

UNITED STATES PATENT OFFICE 2,166,363

STABLE CALCIUM HYPOCHLORITE COMPOSITION

James Douglas MacMahon, Niagara Falls, N. Y., assignor to The Mathieson Alkali Works, Inc., New York, N. Y., a corporation of Virginia No Drawing. Application November 15, 1937, Serial No. 174,660

5 Claims. (Cl. 23—250)

This invention provides improved hypochlorite compositions comprising soda ash and calcium hypochlorite which may also include sodium bicarbonate. The invention provides a dry, stable cleansing and sterilizing mixture which eliminates certain disadvantages commonly experienced in the use of mixtures of a like nature in the past.

It has been proposed to employ dry mixtures of an alkaline substance such as sodium carbonate and a calcium hypochlorite of high purity as a cleansing and sterilizing agent in the washing and disinfection of dairy equipment and equipment used in the preparation and transportation of food products. Such a dry product is stable when in the dry state, but when dissolved in water a metathetical reaction occurs between the components of the mixture to produce sodium hypochlorite and insoluble calcium carbonate which precipitates in the form of a finely divided granular precipitate. It is customary to have the soda ash in large excess over the calcium hypochlorite in order to leave a substantial concentration of the alkaline substance present in the solution present in the solution after precipitation of the insoluble calcium salt. Successful destruction of bacteria is effected by relatively small solution concentrations of soluble hypochlorite. An example of a mixture which has been particularly effective for the purposes described is a mixture containing approximately 25% by weight of the calcium hypochlorite product more completely described below and approximately 75% by weight of sodium carbonate. In practice, a quantity of this mixture sufficient to produce a solution containing approximately 100 parts per million of available chlorine is commonly employed. While such mixtures have been found effective for the purpose desired, their general use has been restricted by the objectionable tendency of the precipitated calcium carbonate to adhere to the surfaces of the equipment being treated, thus producing an unsightly appearance. It is to such mixtures that the present invention is directed.

I have found that when certain minor proportions of tetra sodium pyrophosphate ($Na_4P_2O_7$) are incorporated in dry mixtures of the type described, the precipitate of calcium carbonate which forms on solution loses its tendency to adhere to the sides of the vessels being washed, and that it remains in suspension so that it is readily removed when the solution is removed from contact with the surfaces of the equipment. This improved result appears to be due to the fact that the presence of the relatively small amount of sodium pyrophosphate causes the finely divided granular precipitate to flocculate, and so lose its tendency to adhere to solid surfaces.

I have observed that within certain limits the degree of flocculation of the calcium carbonate is dependent upon the amount of pyrophosphate added to the dry mixture. When quantities below about 4% by weight on the calcium hypochlorite content are employed an insufficient degree of flocculation is produced when the mixture is dissolved, and the adhering tendency of the precipitate is not completely eliminated. On the other hand, if too large a proportion of pyrophosphate is incorporated in the dry mixture, an excessive amount of flocculation occurs on solution, and large flocs are produced which have a rapid rate of settling. An amount of pyrophosphate equivalent to above 32% or greater by weight on the calcium hypochlorite content of the dry mixture produces such a result. I therefore prefer to employ an amount of pyrophosphate in the dry mixture of the present invention which will produce flocs intermediate in size and sufficiently dispersed to possess a relatively long period of suspension. I have found that a dry mixture containing approximately 8% by weight of sodium pyrophosphate on the calcium hypochlorite product content produces a degree of coalescence having optimum advantages and minimum disadvantages. The proportion of pyrophosphate which produces optimum results may vary slightly depending on such variable factors as the degree of hardness in the water supply, and the concentration of the solution. In general, however, satisfactory results are obtained by using mixtures containing approximately 8%–12% pyrophosphate on the calcium hypochlorite content. The following will serve as an illustrative example of a dry mixture which gives optimum results when dissolved in water of about average hardness in sufficient quantity to produce a concentration of available chlorine equal to 100 parts per million:

| | Parts by weight |
|---|---|
| Calcium hypochlorite | 25 |
| Soda ash | 73 |
| Tetra sodium pyrophosphate | 2 |

The proportion of sodium carbonate in the mixture should be at least sufficient to precipitate the calcium present, that is it should be in excess of the equivalent of the calcium present.

The calcium hypochlorite which I prefer to use in the product of the present invention is one which is a stable product high in available chlorine and low in calcium chloride. Characteristically this hypochlorite contains upwards of 50% available chlorine and with particular advantage upwards of 60%. The free lime content is also low. The calcium hypochlorite referred to herein as useful in my process is not to be confused with the conventional bleaching powder or chlorinated lime from which it differs materially, both as to chemical constitution and in its exceptionally high content of available chlorine. The calcium hypochlorite product the preparation of which is described in United States Letters Patent No. 1,787,048, granted to Robert B. MacMullin and Maurice C. Taylor on an application filed August 16, 1928, is particularly useful in the process of the present invention. The term "calcium hypochlorite" as used herein refers to a product having the properties just described. The high stability which such a hypochlorite product possesses is particularly advantageous in the mixed product of the present invention since it permits storage for considerable periods of time without decomposition. Its stability is due in part to its low content of calcium chloride, which at most should not exceed about 10% of the hypochlorite product. When this salt which is very hygroscopic is present in substantial amount, it not only makes the product difficult to keep dry, but it also increases the instability of the product due to the hydrolysis occasioned by the absorbed water.

The mixture of this invention may also include sodium bicarbonate as a diluent in sufficient quantity to keep the available chlorine content of the total composite mixture within any desired maximum limit. The following will serve as an illustrative example of an advantageous dry mixture containing less than 10% available chlorine:

| | Parts by weight |
|---|---|
| Calcium hypochlorite | 13 |
| Soda ash | 9 |
| Sodium bicarbonate | 77 |
| Tetra sodium pyrophosphate | 1 |

Sodium bicarbonate assists in retarding lumpiness when the mixture is exposed to air, and mixtures such as that of the foregoing example are thus particularly advantageous. The available chlorine content of the total composite mixture may also be limited by increasing the proportion of soda ash. The following will serve as an example of such a dry mixture containing less than 10% available chlorine:

| | Parts by weight |
|---|---|
| Calcium hypochlorite | 13 |
| Soda ash | 86 |
| Tetra sodium pyrophosphate | 1 |

Except for that amount required for reaction with the calcium of the hypochlorite, and of any small amounts of the chloride and the hydroxide present, the soda ash of the foregoing example may be replaced, in whole or in part, with sodium bicarbonate.

Acid sodium pyrophosphate may be used in place of tetra sodium pyrophosphate, although in equivalent proportions its use tends to involve the formation of somewhat larger flocs than the tetrasodium pyrophosphate. In mixtures including larger proportions of calcium hypochlorite, the acid sodium pyrophosphate also appears to decrease the rate of solubility of the mixture as compared to a similar mixture containing the tetrasodium pyrophosphate. Both the acid sodium pyrophosphate and the tetra sodium pyrophosphate are soluble in water.

The improved dry mixture of the present invention may be prepared by any conventional method of comminuting and admixing solid chemical substances. A primary precaution necessary in the preparation of the mixture, in addition to the attainment of thorough mixing, is that the substances should be completely dry before mixing. Due to the improved properties of the described calcium hypochlorite, the dry mixture will then remain stable under conditions of storage.

I have further found that the addition of sodium hexametaphosphate and sodium orthophosphate to dry mixtures of calcium hypochlorite and soda ash produces results of a similar nature but in a less satisfactory manner, particularly when employed on a commercial scale. The sodium hexametaphosphate is less economical and normally occurs in less finely divided form thus making intimate admixture with the other ingredients very difficult. The sodium orthophosphate has the objectionable property of causing the rapid formation of large size flocs of calcium carbonate which have a rapid settling rate. Control of the degree of flocculation in order to produce flocs which have a satisfactory period of suspension is difficult if not impossible when the orthophosphate is used.

An improved product for forming clear aqueous solutions containing calcium ions and hypochlorite ions comprising a calcium hypochlorite and a water soluble pyrophosphate has been described and claimed in my copending application Serial No. 174,659, filed November 15, 1937.

I claim:

1. An improved hypochlorite composition comprising a dry mixture of a calcium hypochlorite containing upwards of 50% available chlorine with which is intimately admixed tetra sodium pyrophosphate in proportion not less than about 4% by weight and not exceeding about 30% by weight on the hypochlorite content of the mixture, and sodium carbonate in proportion in excess of the equivalent of the calcium present.

2. An improved hypochlorite composition comprising a dry mixture of a calcium hypochlorite containing upwards of 50% available chlorine with which is intimately admixed tetra sodium pyrophosphate in proportion approximating 8%–12% by weight on the hypochlorite content of the mixture, and sodium carbonate in proportion in excess of the equivalent of the calcium present.

3. An improved hypochlorite composition comprising a dry mixture of a calcium hypochlorite containing upwards of 50% available chlorine with which is intimately admixed tetra sodium pyrophosphate in proportion not less than about 4% by weight and not exceeding about 30% by weight on the hypochlorite content of the mixture, sodium carbonate in proportion in excess of the equivalent of the calcium present, and sodium bicarbonate.

4. An improved hypochlorite composition comprising a dry mixture of a calcium hypochlorite containing upwards of 50% available chlorine with which is intimately admixed acid sodium pyrophosphate in proportion not less than about 4% by weight and not exceeding about 30% by weight on the hypochlorite content of the mixture, and sodium carbonate in proportion in excess of the equivalent of the calcium present.

5. An improved hypochlorite composition comprising a dry mixture of a calcium hypochlorite containing upwards of 50% available chlorine with which is intimately admixed a water soluble sodium pyrophosphate in proportion not less than about 4% by weight and not exceeding about 30% by weight on the hypochlorite content of the mixture, and sodium carbonate in proportion in excess of the equivalent of the calcium present.

JAMES DOUGLAS MacMAHON.